United States Patent
Johnson et al.

(10) Patent No.: US 8,788,613 B2
(45) Date of Patent: Jul. 22, 2014

(54) METHOD AND SYSTEM FOR DISTRIBUTION OF MAP CONTENT TO MOBILE COMMUNICATION DEVICES

(75) Inventors: Eric Johnson, Ottawa (CA); Jesse Boudreau, Ottawa (CA); Ronald Anthony Dicke, Ottawa (CA)

(73) Assignee: BlackBerry Limited, Waterloo (CA)

( * ) Notice: Subject to any disclaimer, the term of this patent is extended or adjusted under 35 U.S.C. 154(b) by 1383 days.

(21) Appl. No.: 11/481,855

(22) Filed: Jul. 7, 2006

(65) Prior Publication Data

US 2007/0233817 A1 Oct. 4, 2007

Related U.S. Application Data

(60) Provisional application No. 60/787,541, filed on Mar. 31, 2006.

(51) Int. Cl.
*G06F 15/16* (2006.01)
*G06F 7/00* (2006.01)

(52) U.S. Cl.
USPC .......................... 709/217; 709/219; 707/706

(58) Field of Classification Search
USPC .................... 709/217, 219; 707/706
See application file for complete search history.

(56) References Cited

U.S. PATENT DOCUMENTS

| | | | | |
|---|---|---|---|---|
| 5,699,255 A * | 12/1997 | Ellis et al. | | 701/212 |
| 6,240,360 B1 * | 5/2001 | Phelan | | 701/438 |
| 6,408,307 B1 * | 6/2002 | Semple et al. | | 707/104.1 |
| 6,708,183 B1 * | 3/2004 | Mori et al. | | 707/104.1 |
| 6,772,142 B1 * | 8/2004 | Kelling et al. | | 707/3 |
| 6,813,608 B1 * | 11/2004 | Baranowski | | 705/6 |
| 7,107,285 B2 * | 9/2006 | von Kaenel et al. | | 707/104.1 |
| 7,813,958 B1 * | 10/2010 | Urbanski et al. | | 705/14.49 |
| 2001/0033284 A1 * | 10/2001 | Chan | | 345/441 |
| 2003/0097374 A1 | 5/2003 | Himeno | | |
| 2004/0027258 A1 * | 2/2004 | Pechatnikov et al. | | 340/995.1 |
| 2004/0117358 A1 * | 6/2004 | von Kaenel et al. | | 707/3 |
| 2004/0119759 A1 | 6/2004 | Barros | | |
| 2005/0268254 A1 * | 12/2005 | Abramson et al. | | 715/855 |

(Continued)

FOREIGN PATENT DOCUMENTS

| | | |
|---|---|---|
| EP | 1167925 A2 | 1/2002 |
| EP | 1274264 A | 1/2003 |
| EP | 1626350 A | 2/2006 |

(Continued)

OTHER PUBLICATIONS

Maozhen Li et al, Multi-Agent Systems for Web-Based Map Information Retrieval, Geograhic Information Science, Lecture Notes in Computer Science vol. 2478, 2002, pp. 161-180.*

(Continued)

*Primary Examiner* — Viet Vu
*Assistant Examiner* — Herman Belcher
(74) *Attorney, Agent, or Firm* — Perry + Currier Inc.; Kristjan Spence

(57) ABSTRACT

A system and method are set forth for distributing map content from a server to a communication device by transmitting a request from the communication device to the map server for a maplet index of map data covering a specified area and identified by coordinates for defining the map data, receiving the request at the map server and in response transmitting the maplet index to the communication device, wherein the maplet index defines content available the maplet without including all of the data points therein.

35 Claims, 19 Drawing Sheets

(56) References Cited

U.S. PATENT DOCUMENTS

| | | | |
|---|---|---|---|
| 2006/0174209 A1* | 8/2006 | Barros | 715/764 |
| 2006/0223518 A1* | 10/2006 | Haney | 455/420 |
| 2006/0293850 A1* | 12/2006 | Ahn et al. | 701/213 |
| 2007/0162942 A1* | 7/2007 | Hamynen et al. | 725/105 |
| 2007/0219708 A1* | 9/2007 | Brasche et al. | 701/207 |

FOREIGN PATENT DOCUMENTS

| | | |
|---|---|---|
| JP | 2001318925 A | 11/2001 |
| JP | 2002279109 A | 9/2002 |

OTHER PUBLICATIONS

Canadian Patent Application No. 2,583,036 dated Aug. 13, 2010.

* cited by examiner

| strLabel (36 bytes) |||||
|---|---|---|---|---|
| S32 | S32 | U16 | U16 | CHAR[24] |
| X | Y | FAC | PRI | TEXT |

FAC = FAC_TYPE  PRI = PRIORITY

Figure 10

Figure 12A
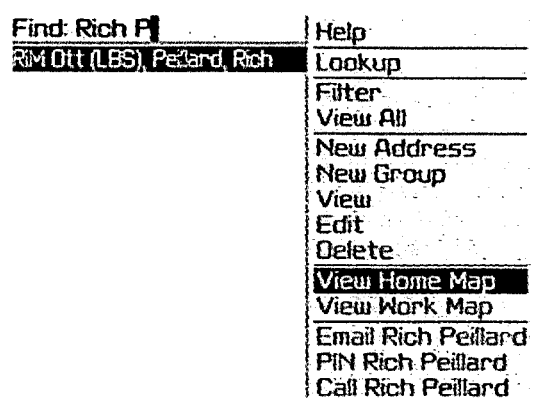
Figure 12B
Figure 12C

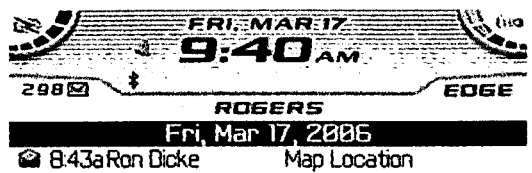
Figure 13A
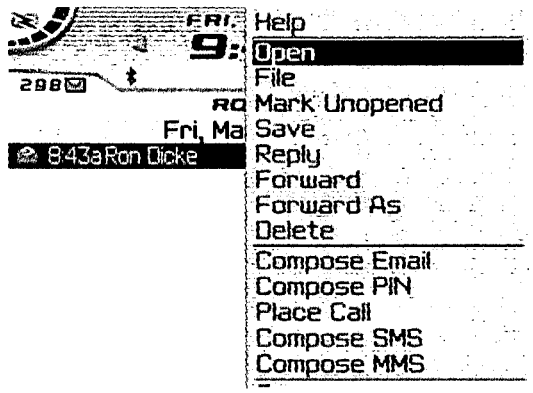
Figure 13B
From: Ron Dicke
Subject: Map Location
You have received a map location.
http://
bbplanet1.ottawa.testnet.rimnet?lat=45.40003&lon=-75.73588&z=1
------------------------------
Sent from my BlackBerry Wireless Handheld
Figure 13C From: Ron Dicke
Subject: Map Location
You have received a map location.

http://
bbplanet.ottawa.testnet.rimnet?lat=45.40003&lon=-75.73588&z=

------------------------
Sent from my BlackBerry Wireless Handheld

Figure 13D

From: Ron Dicke          | Help
Subject: Map Location    | Find
You have received a map location | Copy
                         | Select
http://                  | Mark Unopened
bbplanet.ottawa.testnet.rimnet | File
75.73588&z=              | Save
                         | Reply
------------------------ | Forward
Sent from my BlackBerry Wirele | Forward As
                         | Reply To All
                         | Delete
                         | View Map
                         | View Folder

Figure 13E

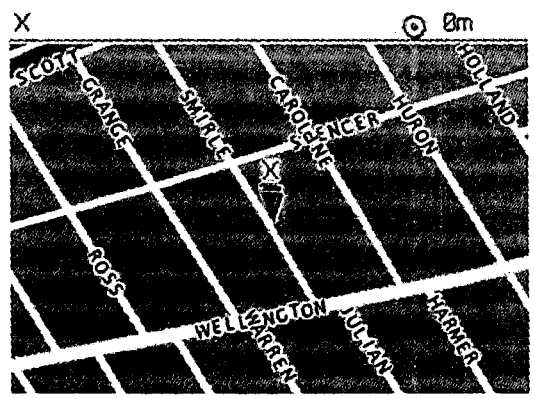

Figure 13F

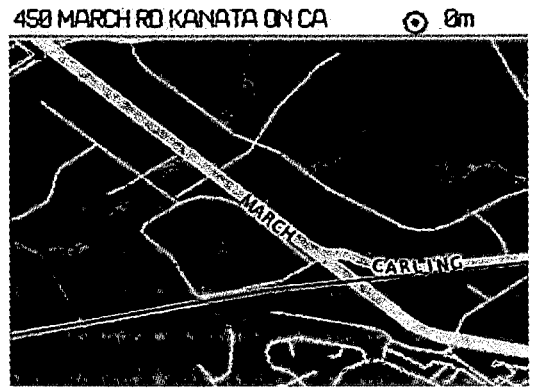
Figure 13G
Figure 13H
Send Using: [Default]
To:
Subject: Map Location
You have received a map location.
http://
bbplanetlottawa.testnet.rim.net?lat=45.34080&lon=-75.91429&z=3
Figure 13I Send Using: Desktop
To: Rich Peillard
To:
Subject: Map Location
You have received a map location.

http://
bbplanetlottawa.testnet.rim.net?lat=45.34080&lon=-75.91429&z=3

METHOD AND SYSTEM FOR DISTRIBUTION OF MAP CONTENT TO MOBILE COMMUNICATION DEVICES

CROSS-REFERENCE TO RELATED APPLICATION

This application claims the benefit of U.S. Provisional Patent Application No. 60/787,541, filed Mar. 31, 2006, the contents of which are incorporated herein by reference.

COPYRIGHT NOTICE

A portion of this specification contains material that is subject to copyright protection. The copyright owner has no objection to the facsimile reproduction by anyone of the patent document, as it appears in the Patent and Trademark Office patent file or records, but otherwise reserves all copyrights whatsoever.

FIELD

The following is directed in general to mobile communication devices, and more particularly to a method for distribution of map content to mobile devices.

BACKGROUND

Mobile communication devices have become popular for business and personal use due to a relatively recent increase in number of services and features that the devices and mobile infrastructures support. Handheld mobile communication devices, sometimes referred to as mobile stations, are essentially portable computers having wireless capability, and come in various forms. These include Personal Digital Assistants (PDAs), cellular phones and smart phones.

More recently, global positioning system (GPS) receivers have been integrated within such mobile communication devices for providing enhanced location-based services (LBS). In operation, a map application within the mobile communication device sends a request to a map server for information relating to a city, restaurant, street address, route, etc. If the device is "location aware", the request includes the current location of the device. The map server extracts generic map content from a Geographical Information Systems (GIS) map database (e.g. Navtech®, TelAtlas®, etc.) at a specified level of resolution (zoom level). Custom graphics associated with the query, such as highlighted route, pushpin for current position or street address, etc. are post-processed and merged by the server with the generic map content. Relevant screen graphics are then labeled, and the merged map graphic is compressed and delivered to the device for display.

One problem associated with the foregoing technical approach to providing mobile mapping service is that the delivered map graphic (DMG) is in the form of a bit-mapped flat file at a specific zoom level that is not scalable (in either lateral (pan) or vertical (zoom) contexts). After the map graphic has been downloaded to the device, subsequent pan or zoom operations from the device will result in further requests to the server. For example, if a DMG is delivered to the device as a 2 Kbyte map at the lowest level (Level 0) resolution field of view (e.g. 1 meter/pixel), then if the user wishes to zoom in to the next highest level (Level 1) resolution field of view the server is required to deliver four 2 Kbytes maps (e.g. 2 meters/pixel). If the user requests Level 2, then 16 2 Kbyte maps of data must be downloaded to the device, and so on. From the foregoing, it is evident that the inability to provide scaling of bit map data according to conventional techniques gives rise to non-linear growth in the amount of data that is required to be downloaded to the device. Also, by merging the labels with the delivered map graphic any labeling that extends between two DMG files is cut off when one of the files is displayed at the device. Furthermore, shipping label sets with all DMG's only to have them discarded by the device is a waste of bandwidth. A relatively low percentage of map graphics actually get labeled, particularly on the small size screen of a mobile device, thereby causing label clutter/collisions.

It will also be appreciated that the downloading of large amounts of map data according to conventional techniques consumes significant over-the-air (OTA) bandwidth requiring considerable time to complete the download. Furthermore, the storing of such large amounts of map data on the device undermines device capability to cache the data.

Moreover, the DMG often is not geocoded with latitude/longitude association, thereby inhibiting implementation of device features like dynamic updating of current position while the device is in motion, or position resolution of any location tag information on the device, such as personal points of interest, etc. In addition, features on DMG that haven't been labeled cannot be queried.

BRIEF DESCRIPTION OF THE DRAWINGS

A detailed description of an exemplary embodiment is set forth in detail below, with reference to the following drawings, in which:

FIG. 10 shows an exemplary data structure for a Label within the Maplet data structure shown in FIG. 3;

FIGS. 12A-12E are screen shots showing display of map data for a contact within an address book application of the mobile communication device client of FIG. 11;

FIGS. 13A-13K are screen shots showing the sending and receiving of map data via an email application of the mobile communication device client of FIG. 11;

DETAILED DESCRIPTION

Figure 1:
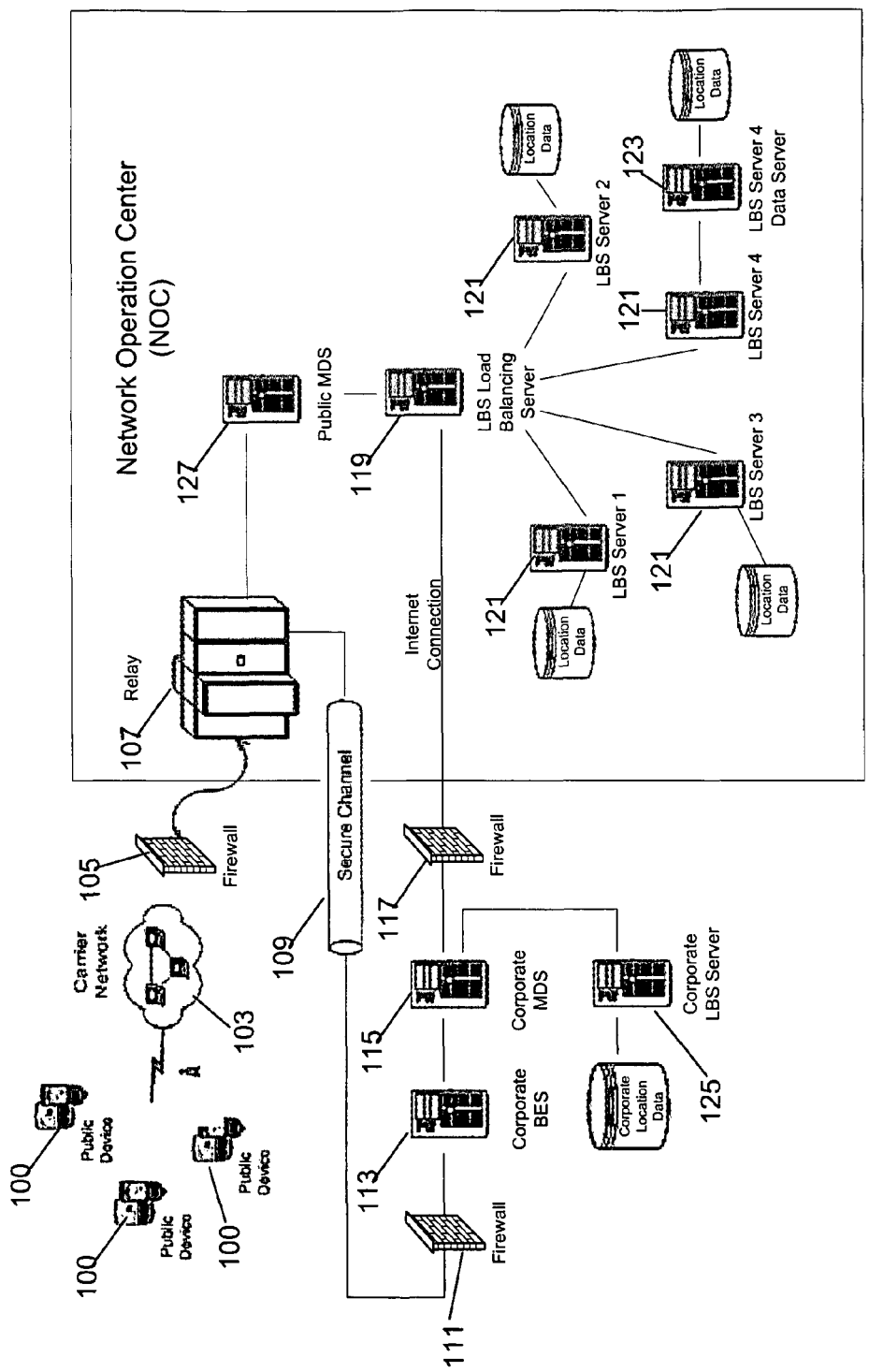
FIG. 1 is a block diagram of a communication system for distribution of map content to a plurality of mobile communication devices.

As set forth in greater detail below, a method, apparatus and data structure are provided for efficient rendering of map artifacts while minimizing connection time of a mobile communication device to a map server. Preferably, map data on the server is accessed by the device on demand, and the device uses local caching and applies context filtering of map data on the server.

According to an aspect of this specification, a Maplet data structure is provided that contains all of the graphic and labeled content associated with a geographic area (e.g. map features such as restaurants (point features), streets (line features), or lakes (polygon features)). Maplets are structured in Layers of "DEntries" (Data Entries) identified by a "Layer ID" to enable data from different sources to be deployed to the device and meshed for proper rendering. Each DEntry is representative of one or more artifact or label (or a combination of both) and includes coordinate information (also referred to a "bounding box" or "bounding area") to identify the area covered by the DEntry and a plurality of data Points that together represent the artifact or label. For example, a DEntry may be used to represent a street on a city map (or a plurality of streets), wherein the various Points within the DEntry are separated into different parts representing various portions of the artifact (e.g. portions of a street). As discussed in greater detail below, a mobile device may issue a request for the map server to download only those DEntries that are included within a specified area or bounding box representing an area of interest that can be represented by, for example, a pair of bottom left, top right coordinates.

As discussed in greater detail below with reference to FIG. 2, the mobile device issues one or more AOI (Area of Interest) requests, DEntry or data requests and Maplet Index requests to the map server, as set forth in greater detail below, for selective downloading of map data based on user context. Thus, rather than transmitting the entire map data with each request from the device, local caching may be used within the mobile device in conjunction with context filtering of map data on the server. For example, if a user's mobile device is GPS enabled and the user is traveling in an automobile at 120 km/hr along a freeway then context filtering can be employed to prevent downloading of map data relating to passing side streets. Or, if the user is traveling in an airplane at 30,000' then context filtering can be employed to prevent downloading of map data for any streets whatsoever. Also, a user's context can be defined, for example, in terms of occupation (e.g. a user whose occupation is transport truck driver can employ context filtering to prevent downloading of map data for side streets on which the user's truck is incapable of traveling, or a user whose occupation is to replenish supplies of soft drink dispensing machines can employ context filtering to download public map data showing the user's geographical area of responsibility with irrelevant features such as lakes or parks filtered out and private map data containing the location of soft drink dispensing machines superimposed on the public map data.

The Maplet Index request results in a Maplet Index (i.e. only a portion of the Maplet that provides a table of contents of the map data available within the Maplet rather than the entire Maplet) being downloaded from the map server to the device, thereby conserving OTA (Over-the-Air) bandwidth and device memory caching requirements. The Maplet Index conforms to the same data structure as a Maplet, but omits the data Points. Consequently, the Maplet Index is small (e.g. 300-400 bytes) relative to the size of a fully populated Maplet or a conventional bit map, and includes DEntry bounding boxes and attributes (size, complexity, etc.) for all artifacts within the Maplet. As the field of view changes (e.g. for a location-aware device that displays a map while moving), the device (client) software assesses whether or not it needs to download additional data from the server. Thus, as discussed above, if the size attribute or complexity attribute of an artifact that has started to move into the field of view of the device (but is not yet being displayed) is not relevant to the viewer's current context, then the device can choose not to display that portion of the artifact. On the other hand, if the portion of the artifact is appropriate for display then the device accesses its cache to determine whether the DEntries associated with that portion of the artifact have already been downloaded, in which case the cached content is displayed. Otherwise, the device issues a request for the map server to download all of the DEntries associated with the artifact portion.

By organizing the Maplet data structure in Layers, it is possible to seamlessly combine and display information obtained from public and private databases. For example, it is possible for the device to display an office building at a certain address on a street (e.g. $1^{st}$ z-order attribute from public database), adjacent a river (e.g. $2^{nd}$ z-order attribute from public database), with a superimposed floor plan of the building to show individual offices (e.g. $11^{th}$ z-order attribute from a private database, accessible through a firewall).

FIG. 1 illustrates an example architecture in which mobile communication devices 100 are connected over a mobile carrier network 103, for communication through a firewall 105 to a relay 107. A mapping application (discussed in greater detail below with reference to FIG. 11) is provided within each of the devices 100 for issuing a request for map data. The request is received at the relay 107 and passed via a secure channel 109 through firewall 111 to a corporate enterprise server 113 and corporate mobile data server 115. The request is then passed via firewall 117 to a load balancing server 119, which passes the request to one or more of a plurality of public LBS servers 121 providing location-based services (LBS) to handle the request. The LBS data may be stored on the server 121, or may be stored on a separate LBS data server 123. Private corporate data stored on corporate LBS server 125 may be added to the public data via corporate MDS server 115 on the secure return path to the device 100. Also, as discussed in greater detail below with reference to FIG. 11, map data from multiple LBS servers can be meshed within the mobile device map application.

Alternatively, where no corporate servers provided, the request from a device 100 may be passed via relay 107 to a public MDS server 127, which sends the request to the LBS load-balancing server 119, and therefrom to one of the plurality of public LBS servers 121 providing location-based services (LBS) to handle the request.

A person of skill in the art will understand that the architecture depicted in FIG. 1 is illustrative only of an exemplary embodiment and that numerous other architecture configurations are possible which for example may include or exclude secure communication channels, replace or omit specific servers or nodes (e.g. the relay 107) in certain implementations, etc.

In the example of FIG. 1, all of the map data for the entire world is divided and stored as a grid within the various map servers 121 according to various levels of resolution (zoom), as set forth below in Table A. Thus, a single A level Maplet represents a 0.05×0.05 degree grid area; a single B level Maplet represents a 0.5×0.5 degree grid area; a single C level Maplet represents a 5×5 degree grid area; a single D level Maplet represents a 50×50 degree grid area and a single E level Maplet represents the entire world in a single Maplet. It is understood that Table 1 is only an example of a particular Maplet grid configuration. Other or different grid configurations can also be developed. As discussed in greater detail below, a Maplet comprises of a set of Layers, with each Layer containing a set of DEntries, and each DEntry containing a set of Points.

TABLE A

| Level | Grid (degrees) | # of Maplets to cover the World | # of Maplets to cover North America | # of Maplets to cover Europe |
|---|---|---|---|---|
| A | 0.05 × 0.05 | 25,920,000 | 356,000 | 100,000 |
| B | 0.5 × 0.5 | 259,200 | 6,500 | 1000 |
| C | 5 × 5 | 2,592 | 96 | 10 |
| D | 50 × 50 | 32 | 5 | 5 |
| E | World | 1 | 1 | 1 |

Figure 2:
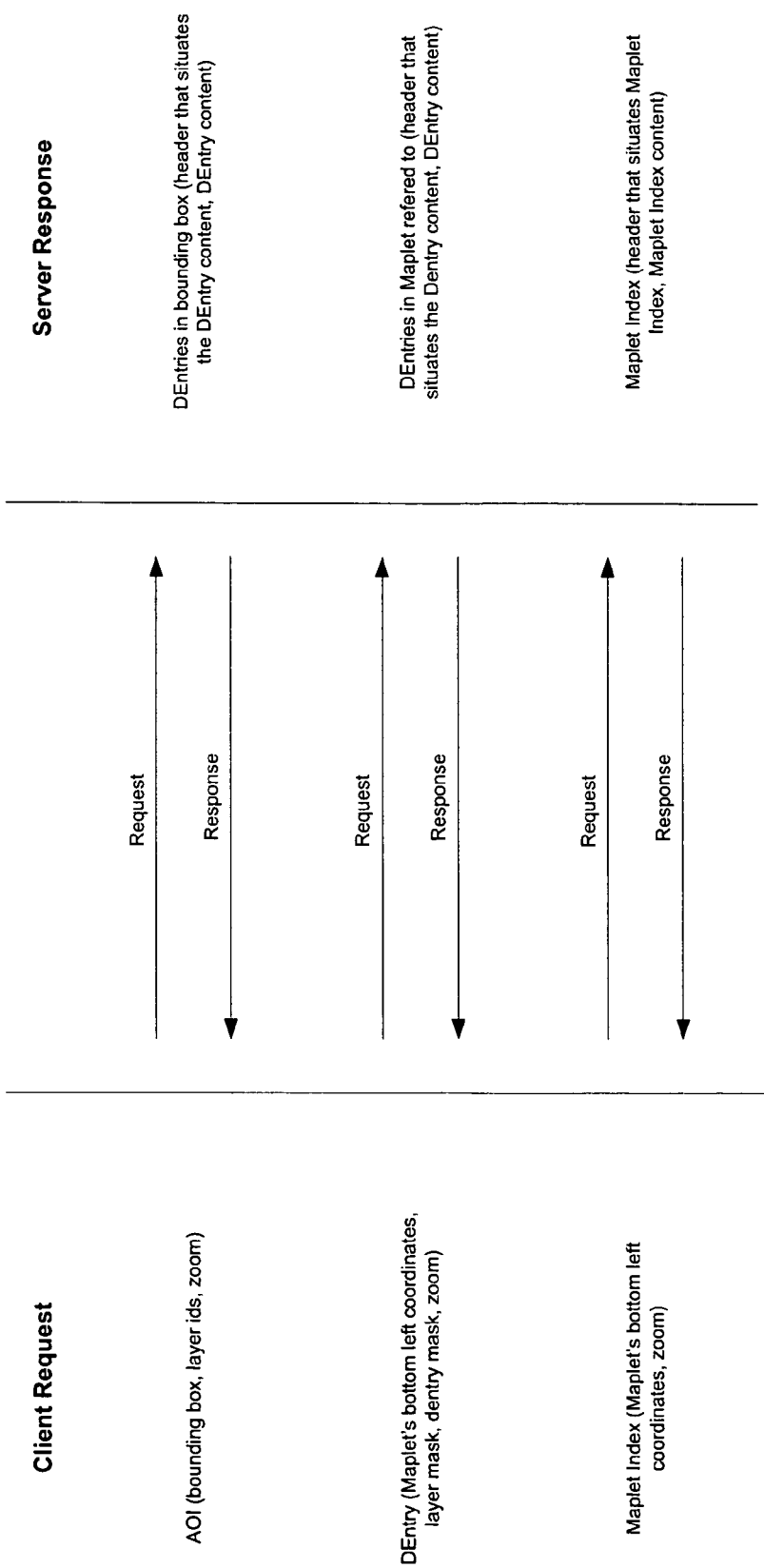
FIG. 2 illustrates an exemplary message exchange between a mobile communication device and a map server for downloading map content to the mobile communication device.

As discussed above and in greater detail with reference to FIG. 2, three types of requests may be generated by a mobile communication device 100 for receipt by map server 121: AOI requests, DEntry requests and Maplet Index requests. The requests may be generated separately or in various combinations, as discussed in greater detail below. An AOI (area of interest) request calls for all DEntries in a given area (bounding box) for a predetermined or selected set of z-order Layers. The AOI request is usually generated when the device 100 moves to a new area so as to fetch DEntries for display before the device client knows what is available in the Maplet. The Maplet Index has the exact same structure as a Maplet but does not contain complete DEntries (i.e. the data Points actually representing artifacts and labels are omitted). Thus, a Maplet Index defines what Layers and DEntries are available for a given Maplet. A data or DEntry request is a mechanism to bundle together all of the required Dentries for a given Maplet. Additional details of an exemplary message exchange between device 100 and map server 121 are provided in FIG. 14, as discussed in greater detail below.

Typically, AOI and Maplet Index requests are paired together in the same message, although they need not be, while DEntry requests are generated most often. For example, when a device 100 moves into an area in connection with which no information has been stored on the device client, the Maplet Index request returns a Maplet Index that indicates what data the client can specifically request from the server 121, while the AOI request returns any DEntries within the area of interest for the specified Layers (if they exist). In the example requests shown on FIG. 2, the desired Maplet is identified within a DEntry request by specifying the bottom-left Maplet coordinate. In addition, the DEntry request may include a layer mask so that unwanted Layers are not downloaded, a DEntry mask so that unwanted data Points are not downloaded, and zoom values to specify a zoom level for the requested DEntry. Once the device client has received the requested Maplet Index, the client typically then issues multiple DEntry requests to ask for specific DEntries (since the client knows all of the specific DEntries that are available based on the Maplet Index).

According to an exemplary embodiment, a collection of 20×20 A-level Maplets (representing a 1×1 degree square) is compiled into a Maplet Block File (.mbl). An .mbl file contains a header which specifies the offset and length of each Maplet in the .mbl file. The same 20×20 collection of Maplet index data is compiled into a Maplet Index file (.mbx). The .mbl and .mbx file structures are set forth in Tables B and C, respectively.

TABLE B

| Address Offset | Offset | Length |
|---|---|---|
| 0x000 | Maplet # 0 Offset (4 bytes) | Maplet # 0 Length (4 bytes) |
| 0x008 | Maplet # 1 Offset | Maplet # 1 Length |
| 0x010 | Maplet # 2 Offset | Maplet # 2 Length |
| ... | ... | ... |
| 0xC78 | Maplet # 399 Offset | Maplet # 399 Length |
| 0xC80 | | Beginning of Maplet # 0 |
| 0xC80 + Size of Maplet # 0 | | Beginning of Maplet # 1 |
| 0xC80 + Size of Maplet # 0 + # 1 | | Beginning of Maplet # 2 |
| ... | | ... |
| 0xC80 + Σ of Size of Maplets (# 0:# 398) | | Beginning of Maplet # 399 |

In Table B, the offset of Maplet #0 is 0x0000_0000 since, according to the illustrated embodiment, the data structure is based on the assumption that the base address for the actual Maplet data is 0x0000_0C80. Therefore the absolute address for Maplet #0 data is: Maplet #0 Address=Base Address (0x0000_0C80)+Maplet #0 Offset (0x0000_0000), and additional Maplet addresses are calculated as: Maplet # (n+1) Offset=Maplet # (n) Offset+Maplet #(n) Length. If a Maplet has no data or does not exist, the length parameter is set to zero (0x0000_0000).

TABLE C

| Address Offset | Offset (4 bytes) | Length (4 bytes) |
|---|---|---|
| 0x000 | Maplet Index # 0 Offset | Maplet Index # 0 Length |
| 0x008 | Maplet Index # 1 Offset | Maplet Index # 1 Length |
| 0x010 | Maplet Index # 2 Offset | Maplet Index # 2 Length |
| ... | ... | ... |
| 0xC78 | Maplet Index # 399 Offset | Maplet Index # 399 Length |
| 0xC80 | | Beginning of Maplet Index # 0 |
| 0xC80 + Size of Maplet Index # 0 | | Beginning of Maplet Index # 1 |
| 0xC80 + Size of Maplet Index # 0 + # 1 | | Beginning of Maplet Index # 2 |
| ... | | ... |
| 0xC80 + Σ of Size of Maplet Indices (# 0:# 399) | | Beginning of Maplet Index # 399 |

In Table C, the offset of Maplet Index #0 is 0x0000_0000 since, according to an exemplary embodiment the data structure is based on the assumption that the base address for the actual Maplet index data is 0x0000_0C80. Therefore the absolute address for Maplet Index #0 data is: Maplet Index #0 Address=Base Address (0x0000_0C80)+Maplet Index #0 Offset (0x0000_0000), and additional Maplet index addresses are calculated as: Maplet Index # (n+1) Offset=Maplet Index # (n) Offset+Maplet Index #(n) Length.

If a Maplet Index has no data or does not exist, the length parameter is set to zero (0x0000_0000).

Figure 3:
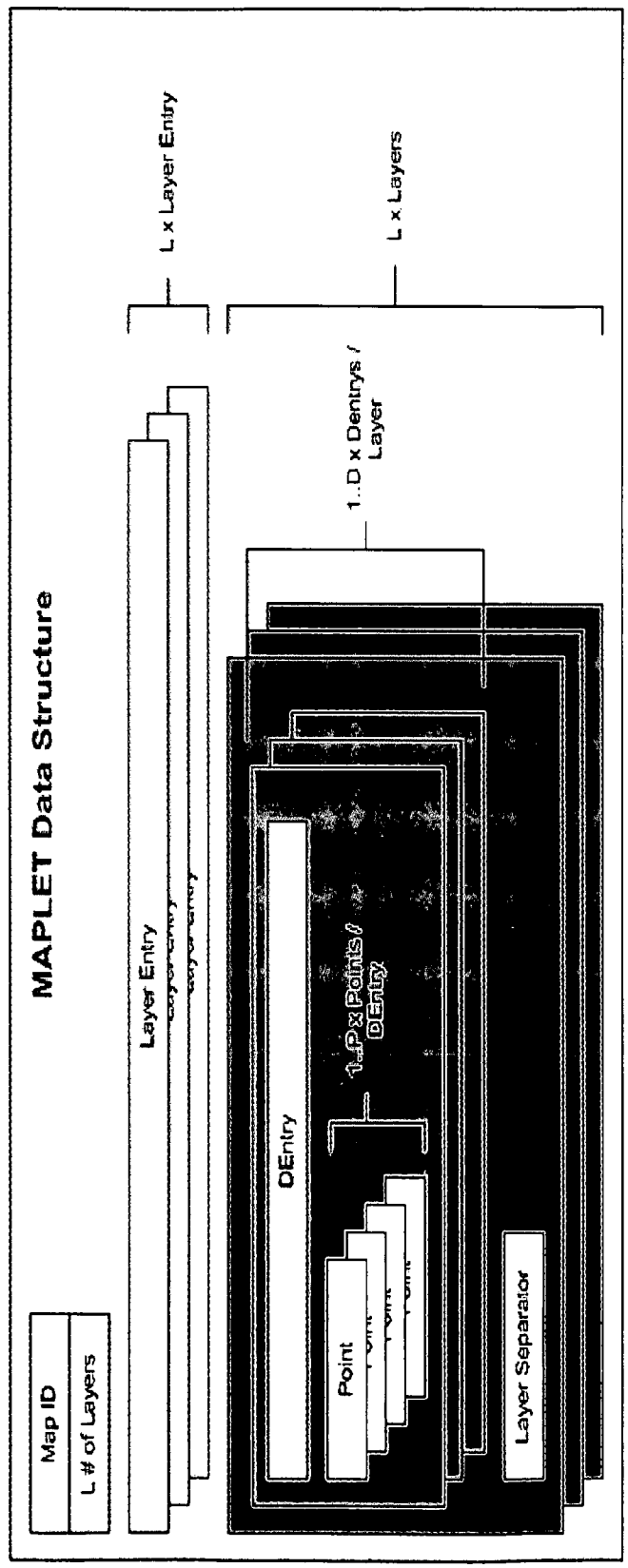
FIG. 3 is a diagram showing a Maplet data structure according to an exemplary embodiment.

FIG. 3 and Table D, in combination, illustrate an exemplary embodiment of a basic Maplet data structure. Generally, as noted above, the Maplet data structure can be said to include a Maplet Index (i.e. an index of the DEntries, each of which representative of either an artifact or a label or both) together with data Points for each DEntry that actually form such artifacts and labels. In this example, each Maplet includes a Map ID (e.g. 0xA1B1C1D1), the # of Layers in the Maplet, and a Layer Entry for each Layer. The Map ID identifies the data as a valid Maplet, and according to one alternative, may also be used to identify a version number for the data. The # of Layers is an integer which indicates the number of Layers (and therefore Layer Entries) in the Maplet. As explained below in further details, each Layer Entry defines rendering attributes and is followed by a list of DEntries for each Layer. As discussed below in further details, the above can be said to form a Maplet Index. For a complete Maplet, each DEntry contains a set of data Points (referred to herein as oPoints) or Labels). It will be noted that Layers can have multiple DEntries and the complete list of DEntrys and Points are grouped by Layer and separated by a Layer Separator (e.g. hex value 0xEEEEEEEE). According to an exemplary embodiment, each Layer Entry is 20 bytes long, and a DEntry is 12 bytes long. However, the number of Layers, number of DEntries per Layer and the number of Points per DEntry depends on the map data and is variable.

Table D provides a high "byte-level" description of a Maplet, where the specific field descriptions for the Layer Entry, DEntry, and Points are set forth in greater detail below.

TABLE D

| Data | Quantity | Total # of Bytes |
|---|---|---|
| Map ID | 1 | 4 bytes |
| # of Layers | 1 | 4 bytes |
| Layer Entrys | # of Layers | 20 bytes × (# of Layers) |
| DEntry of a Layer | × (# of DEntrys in a Layer) | # of Layers 12 bytes × (Σ of the # of DEntrys in each Layer) + |
| Points for DEntry of a Layer | | 4 bytes × (Σ of the # of Points in each DEntry in each layer) + |
| Layer Separator | | 4 bytes × (# of Layers |

Figure 4A:
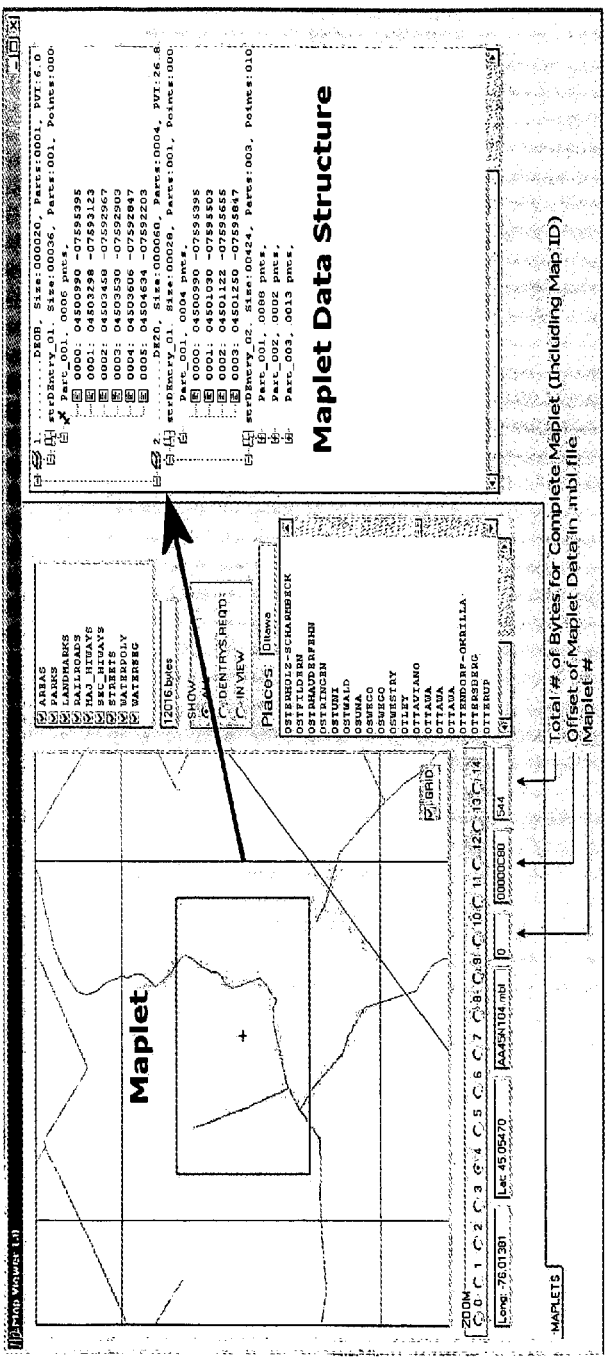
FIG. 4A is a section of a map with associated Maplet data and FIG. 4B shows a field of view intersecting multiple Maplets, according to exemplary embodiments.
Figure 5:
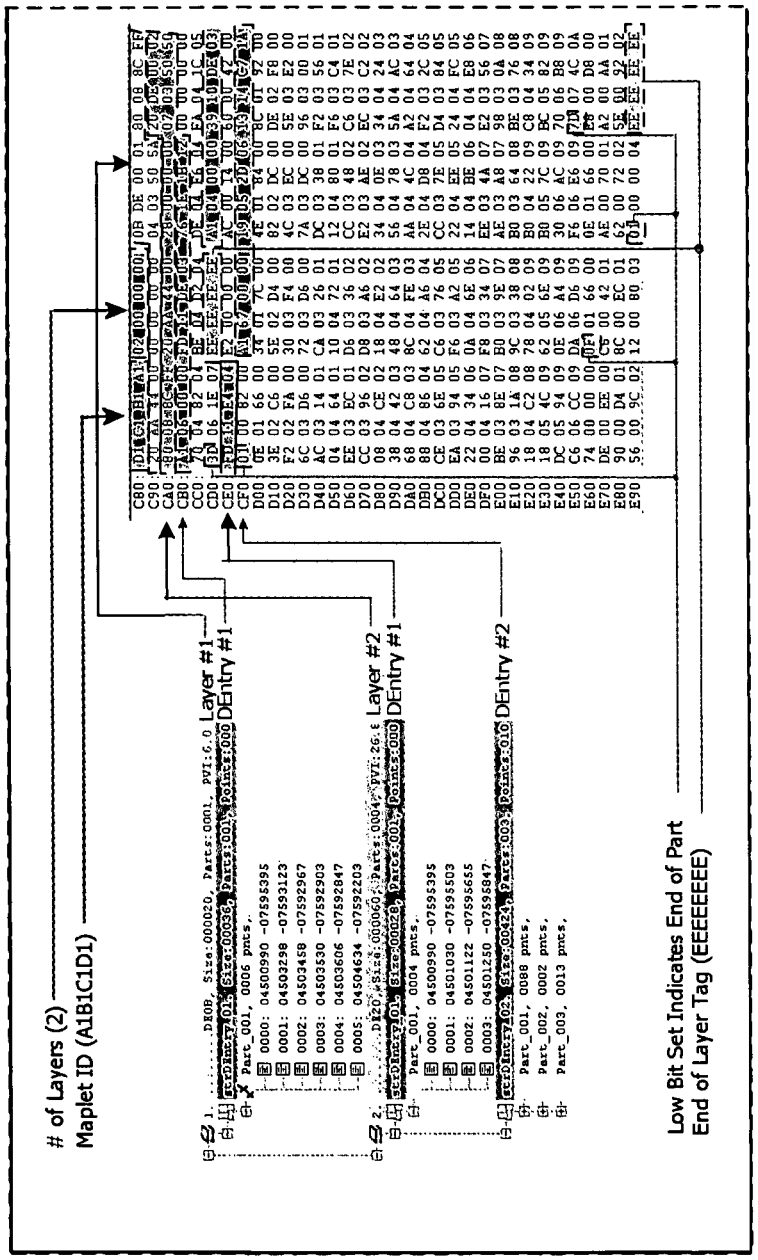
FIG. 5 shows the Maplet data of FIG. 4 in detail.

FIGS. 4A and 5, in combination with Table E, show an exemplary Maplet (Maplet #0) of the .mbl file representing 45-46 degrees North, and 76-75 degrees West (Ottawa Area). As FIG. 4A indicates, the entire Maplet size is 544 bytes, which can be broken down as shown in Table E, below.

TABLE E

| Map ID | 4 bytes |
|---|---|
| # of Layers | 4 bytes |
| Layer Entry #1 | 20 bytes |
| Layer Entry #2 | 20 bytes |
| DEntry #1 of Layer #1 | 12 bytes |
| Points for DEntry #1 of Layer #1 | 24 bytes |
| Layer #1 Separator | 4 bytes |
| Dentry #1 of Layer #2 | 12 bytes |
| Points for DEntry #1 of Layer #2 | 16 bytes |
| Dentry #2 of Layer #2 | 12 bytes |
| Points for DEntry #2 of Layer #2 | 412 bytes |
| Separator for Layer #2 | 4 bytes |
| Total for Maplet | 544 bytes |

For purposes of explanation, FIG. 4A shows the complete data set for Maplet #0, including the Layer Entrys, DEntrys and Points, and Maplet size. However, in practice, only the graphical map data is displayed on mobile device 100 for ease of viewing and in order to reduce clutter.

As shown in FIGS. 4A and 5, the Points of each DEntry are divided into parts. For example the last DEntry (Layer #2, DEntry #2) has a total of 103 Points divided into 3 parts, one part of 88 Points, one of 2 Points and one of 13 Points. With graphical map data, a series of Points may represent one line connecting all of the Points, or alternatively a series of lines (parts). Parts are represented by setting a bit in the Points data structure to indicate the end of a Part (i.e. the Most Significant Bit (MSB) in the exemplary embodiment of FIG. 5), as described in greater detail below.

Figure 4B:
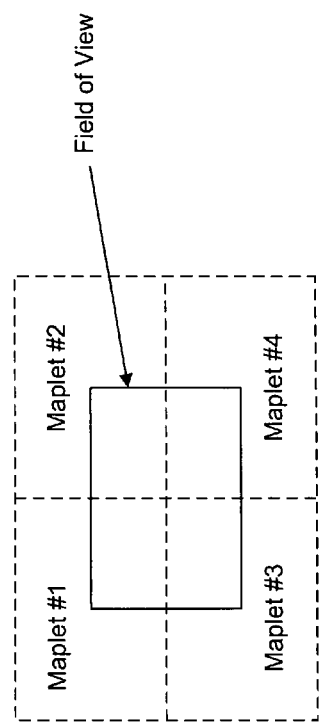

FIG. 4B shows an exemplary field of view for a mobile communication device 100, which intersects a plurality of Maplets (in this case four Maplets identified as Maplet #1, Maplet #2, Maplet #3 and Maplet #4). Therefore, in order to render map images for the representative field of view the map application within device 100 must access data from four Maplets. Details of an exemplary method of accessing the map data are set forth in greater detail below with reference to FIGS. 14 and 15.

Figure 6:
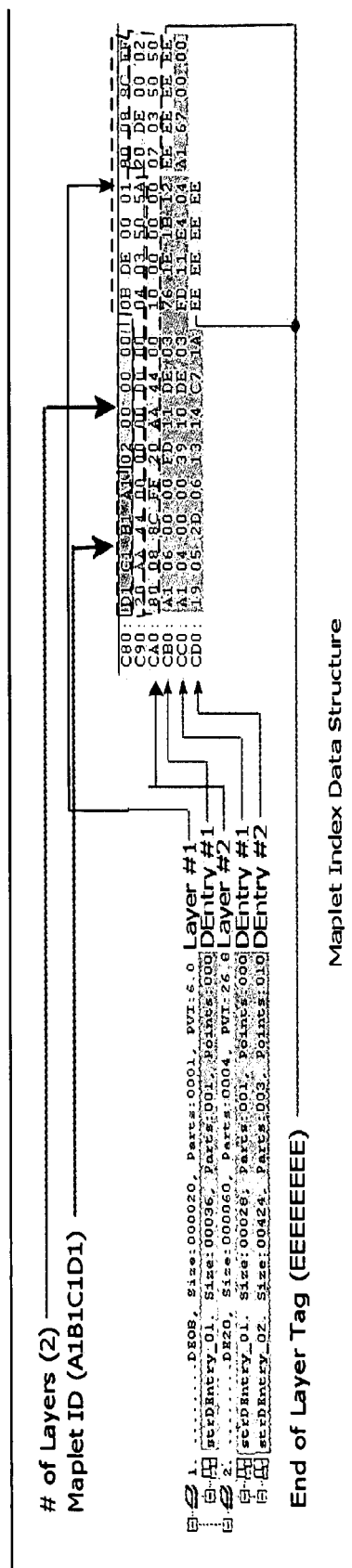
FIG. 6 shows the structure of a Maplet index for the Maplet data of FIGS. 4 and 5.

As discussed above, the Maplet Index Data Structure is identical to the Maplet Data Structure except that the DEntries contain no Points (i.e. set of data Points (oPoints) or Labels) and are therefore all exactly 12 bytes. FIG. 6 and Table F show the equivalent Maplet Index for the Maplet shown in FIGS. 4 and 5, including the size of the Maplet Index file (92 bytes), which is significantly less than the size of the complete Maplet (544 bytes).

TABLE F

| Map ID | 4 bytes |
|---|---|
| # of Layers | 4 bytes |
| Layer Entry #1 | 20 bytes |
| Layer Entry #2 | 20 bytes |
| DEntry #1 of Layer #1 | 12 bytes |
| Layer #1 Separator | 4 bytes |
| Dentry #1 of Layer #2 | 12 bytes |
| Dentry #2 of Layer #2 | 12 bytes |
| Separator for Layer #2 | 4 bytes |
| Total for Maplet Index | 92 bytes |

Figure 7:
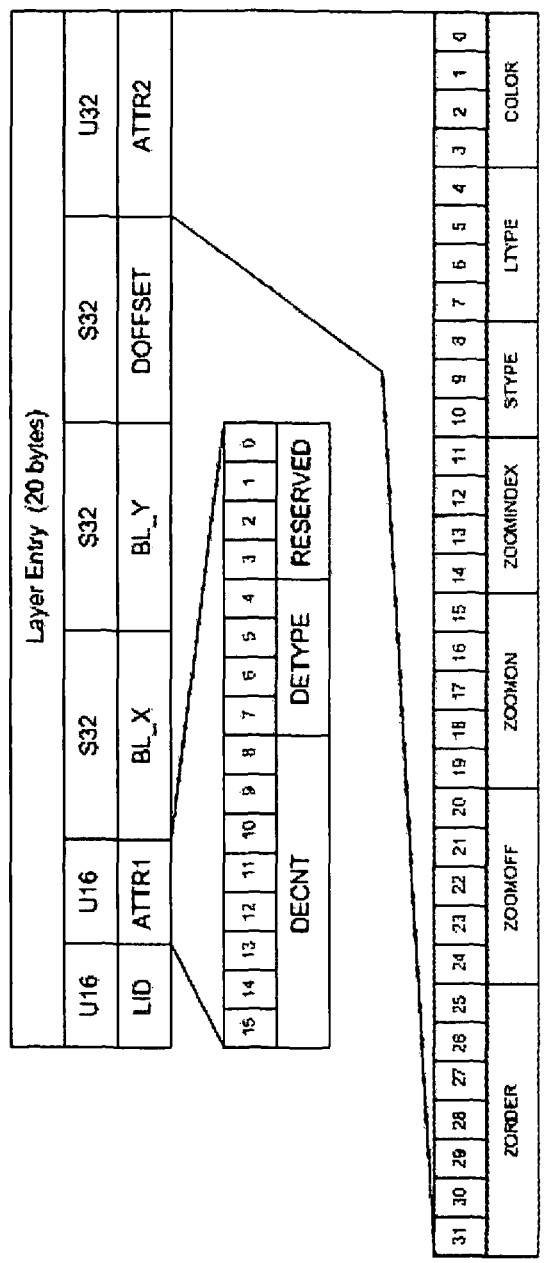
FIG. 7 shows an exemplary data structure for a Layer Entry within the Maplet data structure shown in FIG. 3.

In this example, each Layer Entry is 20 bytes long and consists of 6 fields as shown in FIG. 7 and Table G, below, including attributes used for rendering DEntries associated with that Layer Entry on a display of mobile device 100. In this example, the DEntry rendering attributes are part of and associated with a particular Layer Entry but could alternatively be located within a different portion of the Maplet Index data structure and be associated with either more than one or all of the Layer Entries or specific DEntries of a particular Maplet. In the example of Table G, the rendering attributes include a zoom index, a shape type, a line type and a color field but it is understood that the number and type of attributes used may be customized to meet different rendering requirements. Also, in Table G, it should be noted that Latitude and Longitude are specified in decimal degrees with 5 decimal places of accuracy ($1/100,000^{th}$ of a degree). The Bottom Left Latitude and Longitude of the Layer are identical to the Bottom Left Latitude and Longitude of the Maplet. The address of the $1^{st}$ DEntry of the Layer is calculated as follows: $1^{st}$ DEntry Address for Layer=Maplet Base Address+8+(# of Layers)*20+DOFFSET.

TABLE G

| Field | Type | Sub-Field | # of bits | Description |
|---|---|---|---|---|
| LID | Unsigned 16 bit word | | | Layer ID. See Table below for IDs. |
| ATTR1 | Unsigned 16 bit word | DECNT | 8 | DEntry Count. # of DEntrys in this Layer. |
| | | DETYPE | 4 | DEntry Type. One of the following:<br>DETYPE / Value / Description<br>DETYPE_OPOINT / 0 / DEntry is a set of Points<br>DETYPE_LABEL / 1 / DEntry is a Label |
| | | RESERVED | 4 | Reserved for Future Use |
| BL_X | Signed 32 bit word | — | | Longitude of Bottom Left corner of the Layer |
| BL_Y | Signed 32 bit word | — | | Latitude of Bottom Left corner of the Layer |
| DOFFSET | Signed 32 bit word | | | Relative Offset of the 1$^{st}$ DEntry of the Layer |
| ATTR2 | Unsigned 32 bit word | ZORDER | 7 | Range = [0:127]<br>ZORDER determines the order of rendering the Layer. Layers are rendered from ZORDER = 0 first to ZORDER = 127 last. |
| | | ZOOMOFF | 5 | Range = [0:31]<br>ZOOMOFF specifies the ZOOM LEVEL that the Layer Data is no longer displayed. |
| | | ZOOMON | 5 | Range = [0:31]<br>ZOOMON specifies the ZOOM LEVEL that the Layer Data is first displayed. |
| | | ZOOMINDEX | 4 | ZOOMINDEX is used to scale the Point Data for the Layer. All Points within a DEntry are scaled as follows:<br>ZOOMINDEX / Scaling / Left Shift<br>0 / ×4 / 2 bits<br>1 / ×64 / 6 bits<br>2 / ×1024 / 10 bits<br>3 / ×16384 / 14 bits |
| | | STYPE | 3 | Shape Type. Determines how to render the DEntry data. Point, Arc and Polygon types consist of a set of Points and Label consists of a Label Data Structure (see DEntry).<br>STYPE / Value / Description<br>SHPT_POINT / 1 / DEntry is a Point<br>SHPT_ARC / 3 / DEntry is a Line<br>SHPT_POLYGON / 5 / DEntry is a Polygon<br>SHPT_LABEL / 7 / DEntry is a Label |
| | | LTYPE | 4 | Line Type. Determines how to render the line. Currently this represents a thickness.<br>LTYPE / Value / Description<br>LINE_TYPE_1PXL / 0 / 1 pixel line width<br>LINE_TYPE_2PXL / 1 / 2 pixel line width<br>LINE_TYPE_3PXL / 2 / 3 pixel line width<br>LINE_TYPE_NULL / 3 / No Line Type |
| | | COLOR | 4 | Rendering Color. Specifies the color used to draw the Layer data. Currently there are 16 colors available which map to RGB 16 bit values as shown in the table.<br>Color / Value / RGB16( )<br>CLEAR / 0 / (00, 00, 00)<br>DRED / 1 / (24, 00, 00)<br>LGREEN / 2 / (18, 31, 18)<br>WATERBLUE / 3 / (16, 20, 31)<br>BLACK / 4 / (00, 00, 00)<br>GREY / 5 / (26, 26, 26)<br>LRED / 6 / (31, 28, 28)<br>DGREY / 7 / (18, 18, 18)<br>LGREY / 8 / (28, 28, 28)<br>RED / 9 / (31, 00, 00)<br>GREEN / 10 / (00, 28, 00)<br>YELLOW / 11 / (31, 31, 00)<br>BLUE / 12 / (00, 00, 31)<br>MAGENTA / 13 / (31, 00, 31)<br>CYAN / 14 / (00, 31, 31)<br>WHITE / 15 / (31, 31, 31) |

Table H depicts a list of exemplary Layers and respective Layer IDs.

TABLE H

| LAYER ID | Value |
|---|---|
| LID_ROOT | 0xDE00 |
| LID_PARKING | 0xDE01 |
| LID_AUTOSVC | 0xDE02 |
| LID_SHOPPING | 0xDE03 |
| LID_BANKS | 0xDE04 |
| LID_HOSPITALS | 0xDE05 |
| LID_PARKS | 0xDE06 |
| LID_PLACES_1K | 0xDE07 |
| LID_PLACES_BIG | 0xDE08 |
| LID_PLACES | 0xDE09 |
| LID_MAPLETS | 0xDE0A |
| LID_RAILROADS | 0xDE0B |
| LID_RESTAURANTS | 0xDE0C |
| LID_DESTINATIONS | 0xDE0D |
| LID_TRANSPORTATION | 0xDE0E |
| LID_LANDMARKS | 0xDE0F |
| LID_WATERPOLY | 0xDE10 |
| LID_WATERSEG | 0xDE11 |
| LID_DEFAULT | 0xDE12 |
| LID_AREAS | 0xDE13 |
| LID_STREETS | 0xDE14 |
| LID_SECHWYS | 0xDE15 |
| LID_MAJHWYS | 0xDE16 |
| LID_GRID1 | 0xDE17 |
| LID_GRID2 | 0xDE18 |
| LID_GRID3 | 0xDE19 |
| LID_OCEANS | 0xDE1A |
| LID_MAJHWYSHIELD | 0xDE1B |
| LID_SECHHWYSHIELD | 0xDE1C |
| LID_AREA | 0xDE1D |
| LID_STREETS_12 | 0xDE1E |
| LID_STREETS_34 | 0xDE1F |
| LID_STREETS_5 | 0xDE20 |
| LID_C1_LABELS | 0xDE21 |
| LID_C2_LABELS | 0xDE22 |
| LID_C3_LABELS | 0xDE23 |
| LID_C4_LABELS | 0xDE24 |
| LID_C5_LABELS | 0xDE25 |

Figure 8:
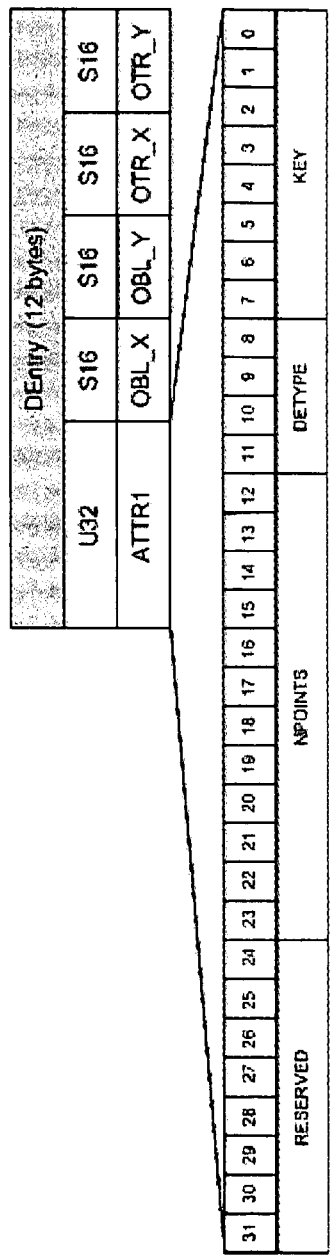
FIG. 8 shows an exemplary data structure for a DEntry within the Maplet data structure shown in FIG. 3.

In this example, the DEntry data structure consists of 12 bytes as shown in FIG. 8 and further described in Table I, below. A DEntry specifies the number of Points, the type of Points (i.e. set of data points (oPoints) or a Label) and the bounding box for these Points, with different types of DEntry data being provided (Labels and Points), as described in greater detail below.

It should be noted that in this example, the offset Latitude and Longitude representing the boundary box are specified in decimal degrees with 5 decimal places of accuracy ($1/100,000^{th}$ of a degree). The Bottom Left Latitude and Longitude of a DEntry are added to the Bottom Left Latitude and Longitude of the Layer to obtain the absolute Latitude and Longitude.

According to an exemplary embodiment, there are two types of data (specified by the DETYPE field): oPoints and strLabels. oPoints are used to represent and reconstruct a point, line or polygon, whereas the strLabel data structure is used to represent label data.

Figure 9:
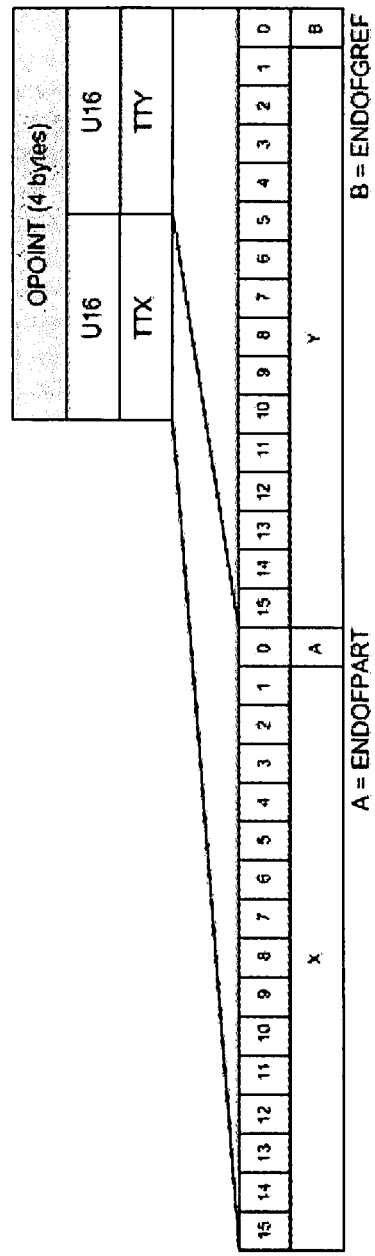
FIG. 9 shows an exemplary data structure for a Point within the Maplet data structure shown in FIG. 3.

The oPoint data structure is illustrated in FIG. 9 and described in Table J, below, while the strLabel data structure is illustrated in FIG. 10 and described in Table L.

TABLE J

| Field | Type | Sub-Field | # of bits | Description |
|---|---|---|---|---|
| TTX | Unsigned 16 bit word | X | 15 | Relative Offset Longitude of Point from previous Point |
|  |  | ENDOFPART | 1 | 1 = End of Part |
| TTY | Unsigned 16 bit word | Y | 15 | Relative Offset Latitude of Point from previous Point |
|  |  | ENDOFGREF | 1 | 1 = End of GREF or End of |

In FIG. 9 and Table J, X and Y are relative offsets in Longitude and Latitude respectively from the previous oPoint. The first oPoint is relative to the bottom left coordinates of the DEntry. It should be noted that the X and Y co-ordinates are first scaled by a Zoom Scale which is determined by the ZOOMINDEX of the Layer Entry. The ZOOMINDEX and scaling (Zoom Scale) are shown in Table K, below (extracted from Table G).

TABLE K

| ZOOMINDEX | Scaling | Left Shift |
|---|---|---|
| 0 | ×4 | 2 bits |
| 1 | ×64 | 6 bits |
| 2 | ×1024 | 10 bits |
| 3 | ×16384 | 14 bits |

TABLE I

| Field | Type | Sub-Field | # of bits | Description |
|---|---|---|---|---|
| ATTR1 | Unsigned 32 bit word | RESERVED | 8 | Reserved for Future Use |
|  |  | NPOINTS | 12 | # of Points in the DEntry |
|  |  | DETYPE | 4 | DEntry Type. One of the following: |
|  |  |  |  | DETYPE   Value   Description |
|  |  |  |  | DETYPE_OPOINT   0   DEntry is a set of Points |
|  |  |  |  | DETYPE_LABEL   1   DEntry is a Label |
|  |  | KEY | 8 | 0xA1 Identifies Structure as a DEntry |
| OBL_X | Signed 16 bit word | — |  | Offset Longitude of Bottom Left corner of the DEntry |
| OBL_Y | Signed 16 bit word | — |  | Offset Latitude of Bottom Left corner of the DEntry |
| OTR_X | Signed 16 bit word | — |  | Offset Longitude of Top Right corner of the DEntry |
| OTR_Y | Signed 16 bit word | — |  | Offset Latitude of Top Right corner of the DEntry |

The ENDOFPART bit is used to separate the individual Points in the series of Points of a DEntry. When the ENDOF-PART bit is set it indicates that a particular Point is the last in a series of connected Points. This informs the map application within device 100 that instead of drawing a line to the next point, it should move to the next point (without drawing a line). The reason this bit is needed is because within a DEntry (which is essentially an area) there will be multiple lines or polygons or points with the DEntry. This bit is used to separate the shapes.

The ENDOFGREF bit is used only for a series of points that represent a polygon (STYPE=SHPT_POLYGON) to indicate that the next part is a "Hole Polygon", rather than a regular Polygon. A Hole Polygon is needed since certain areas (represented by polygons) may have holes in them (e.g. a section of a river (represented by a polygon) with an island in the middle (represented by a hole polygon)).

If both ENDOFPART and ENDOFGREF are set then the next polygon is a hole polygon. If only the ENDOFPART bit is set then the next polygon is a regular polygon.

Table L describes the fields depicted in the strLabels data structure of FIG. 10, as follows:

TABLE L

| Field | Type | Sub-Field | # of bits | Description |
|---|---|---|---|---|
| X | Signed 32 bit word | | 32 | Longitude of Label |
| Y | Signed 32 bit word | | 32 | Latitude of Label |
| FAC_TYPE | Unsigned 16 bit word | | 16 | Reserved |
| PRIORITY | Unsigned 16 bit word | | 16 | Reserved |
| TEXT | Character Array | | 192 | Label |

In this example, the strLabel Point consists of an X and Y Longitude and Latitude value and 24 Characters of the Label Text. The X and Y co-ordinates provide an exact location to plot the label.

According to an exemplary embodiment, the typedef statements for the Layer Entry, DEntry, Point, and Label data structures are as follows:

```
Layer Entry:
    typedef struct {
        u16 id;
        union {
            u16 attr1;
            struct{
                u16 unused:  4;
                u16 detype:  4;
                u16 dcnt:    8;
            };
        };
        s32 bl_x;
        s32 bl_y;
        s32 doffset;
        union {
            u32 attr2;
            struct{
                u32 color:      4;
                u32 ltype:      4;
                u32 stype:      3;
                u32 zoomindex:  4;
                u32 zoomon:     5;
                u32 zoomoff:    5;
                u32 zorder:     7;
            };
        };
    } strLayerEntry;
DEntry:
    typedef struct {
        union {
            u32 attr1;
            struct{
                u32 key:         8;
                u32 detype:      4;
                u32 npoints:    12;
                u32 AliasEnable: 1;
                u32 AliasDEntry: 5;
            };
        };
        union {
            s16 obl_x;
            s16 Maplet_x;
        };
        union {
            s16 obl_y;
            s16 Maplet_y;
        };
        s16 otr_x;
        s16 otr_y;
    } strDEntry;
Point:
    typedef struct {
        union {
            u16 ttx;
            struct{
                u16 EndOfPart: 1;
                u16 x: 15;
            };
        };
        union {
            u16 tty;
            struct{
                u16 EndOfGRef: 1;
                u16 y: 15;
            };
        };
    } oPoint;
Label:
    typedef struct {
        s32 x;
        s32 y;
        u16 fac_type;
        u16 priority;
        char text[24];
    } strLabel;
```

FIG. 11 shows, in greater detail, a representative communication system 100 communicating with a plurality of map servers 121 for implementing location-based services.

The provision of location based services (LBS) uses a client-service architecture where the client component comprises a map application 1000 running on the mobile device 100 for providing the end-user with the capability to perform location-related tasks. Although the server component is shown residing on public LBS server 121, it may also reside either on a corporate enterprise server (such as server 113 shown in FIG. 1), or a corporate LBS server (such as server 125 shown in FIG. 1). The server component houses location-related data, contains the business logic to manipulate this data and fulfills LBS requests from the client 1001. Also, as shown in FIGS. 1 and 11, the map application 1005 is capable of meshing map data from multiple servers 121.

Communications between the mobile communication device 100 and each server 121 are either http-based or TCP/IP socket-based. The former is used for LBS data requests and device location reporting initiated by the device 100 and are exchanged as messages over the network carrier 103, Internet connection and the public Network Operations Center (NOC) or corporate enterprise server 113 (FIG. 1). These communications adhere to a set of well-to find LBS communications protocols supporting both single and batch requests, as discussed in greater detail below.

In addition, the LBS system preferably interfaces with external systems such as a Data Authority (not shown) to obtain and synchronize location data, as well as to provide an administrative interface for a system administrator to configure the LBS server 121.

As discussed briefly above in connection with FIG. 1, mobile communication device 100 is preferably a two-way communication device having at least voice and advanced data communication capabilities, including the capability to communicate with other computer systems. Depending on the functionality provided by mobile communication device 100, it may be referred to as a data messaging device, a two-way pager, a cellular telephone with data messaging capabilities, a wireless Internet appliance, or a data communication device (with or without telephony capabilities). Mobile communication device 100 may communicate with any one of a plurality of LBS servers 121 within its geographic coverage area, as discussed above in connection with FIG. 1.

Mobile communication device 100 will normally incorporate a transceiver 1001, which includes a receiver, a transmitter, and associated components, such as an antenna 1002. As will be apparent to those skilled in the field of communications, particular design of transceiver 1001 depends on the communication network in which the mobile communication device 100 is intended to operate.

Mobile communication device 100 may send and receive communication signals over the network after required network registration or activation procedures have been completed. Signals received by antenna 1002 through the network are input to transceiver 1001, which may perform such common receiver functions as signal amplification, frequency down conversion, filtering, channel selection, analog-to-digital (A/D) conversion, and the like. A/D conversion of a received signal allows more complex communication functions such as demodulation and decoding to be performed. In a similar manner, signals to be transmitted or processed, including modulation and encoding, for example via a Digital Signal Processor (not shown). These DSP-processed signals are input to transceiver 1001 for digital to analog (D/A) conversion, filtering, amplification and transmission over communication network via antenna 1002.

Network access is associated with a subscriber or user of a mobile communication device 100, and therefore mobile communication device 100 requires a Subscriber Identity Module or "SIM" card 1004 to be inserted in a SIM interface (not shown) in order to operate in the network. Mobile communication device 100 is a battery-powered device so it also includes a battery interface for receiving one or more rechargeable batteries 1006. Such a battery 1006 provides electrical power to most if not all electrical circuitry in mobile communication device 100, and the battery interface (not shown) provides for a mechanical and electrical connection.

Mobile communication device 100 includes a microprocessor 1008 which controls overall operation. Communication functions, including at least data and voice communications, are performed through transceiver 1001. Microprocessor 1008 also interacts with additional device subsystems such as a display 1110, a flash memory 1112, a random access memory (RAM) 1114, a keyboard 1116, a speaker 1118, a microphone 1120, and any other device subsystems that may be desirable such as auxiliary input/output (I/O) subsystems, serial port, and/or short-range communications.

Operating system software 1122 used by microprocessor 1008 is preferably stored in a persistent store such as flash memory 1112, which may alternatively be a read-only memory (ROM) or similar storage element (not shown). Those skilled in the art will appreciate that the operating system, specific device applications, or parts thereof, may be temporarily loaded into a volatile store such as RAM 1114.

Microprocessor 1008, in addition to its operating system functions, preferably enables execution of software applications on mobile communication device 100. A predetermined set of applications which control basic device operations, including at least data and voice communication applications, will normally be installed on mobile communication device 100 during its manufacture. A preferred application that may be loaded onto mobile communication device 100 may be a personal information manager (PIM) application having the ability to organize and manage data items relating to the user such as, but not limited to, e-mail, calendar events, voice mails, appointments, and task items. Naturally, one or more memory stores are available on mobile communication device 100 and SIM 1004 to facilitate storage of PIM data items and other information.

As discussed above, memory 1112 includes a plurality of applications or routines (associated with visually displayed icons) for the processing of data. These applications may be in any of a variety of forms such as, without limitation, software, firmware, and the like, including, for example, an e-mail application 1115, a calendar application 1124, an address book application 1111, a tasks application 1128, a memo application 1130, and a search application 1127. An operating system (OS) program 1122 also resides in memory 1112. The mobile communication device 100 of the present disclosure is also adapted to render visual maps in its visual display 1110, and utilizes a map application 1000 stored in memory 1112 to facilitate map rendering and related functionality. Preferably, map application 1000 incorporates several functional modules including a Map Viewer 1005, a Route Module 1007, and a Locate Module 1009, as shown in FIG. 11B.

Map Viewer 1005 receives Latitude and Longitude data as inputs from any one or more of multiple sources, such as Point of Interest (POI) servers, local cache, embedded GPS units, etc. The Map Viewer 1005 uses the Latitude and Longitude data as arguments to render map graphics (either cached or requested from server 121, as discussed above).

Locate Module 1009 converts street or civic addresses to Latitude and Longitude coordinates through a Locate Server or other device that may or may not be part of LBS server 121.

Route Module converts a pair of "to" and "from" coordinates (i.e. civic or street addresses) to a pair of Latitude and Longitude coordinates, and also generates a set of decision points (e.g. left, right, etc.) at relevant intersections to enable rendering by way of graphics on Map Viewer 1000, or to provide turn-by-turn directions in text format.

The Map Viewer 1005, Route Module 1007 and Locate Module 1009 constitute but one example of a number of possible implementations of Map Application 1000, all of which would be obvious to a person of ordinary skill in the art.

Figure 12D:
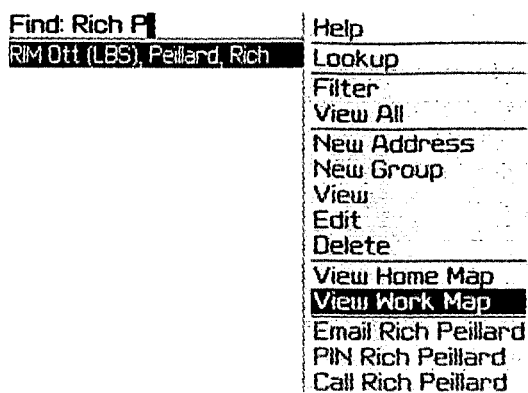
Figure 12E:

As shown in FIGS. 12A to 12E, a user may search for an address book entry (FIG. 12A), click the device thumbwheel to select and view a home map for that address book entry ((FIG. 12B), which results in the Map Viewer Module 1005 displaying the home address for the address book entry ((FIG. 12C). If the user clicks the thumbwheel again and selects to review the work map for that address book entry ((FIG. 12D), the Map Viewer Module 1005 displays the work address for the address book entry ((FIG. 12E).

With reference to FIGS. 13A-13F, user interaction with a graphical user interface is described for the purpose of displaying map data embedded in an e-mail message. In FIG. 13A, an e-mail is received. The user opens the e-mail (FIG. 13B) by manipulating a thumbwheel or other user input device. In the event that the e-mail contains a map URL (FIG.

13C), the user can select the map URL (FIG. 13D) and click a "View Map" menu item (FIG. 13E), in response to which the Map Viewer Module 1005 displays the map embedded in the e-mail (FIG. 13F).

Figures 13J, 13K:
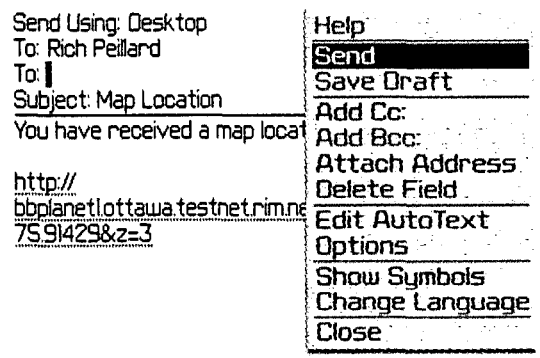

In FIGS. 13G-13K, user interaction with the device client graphical user interface is shown for the purpose of embedding map data into an e-mail message. In FIG. 13G, the user is viewing a displayed map on device 100. The user selects an "E-Mail Location" menu item (FIG. 13H) by manipulating a thumbwheel or other user input device. An e-mail message is then created with the map URL embedded in the body of the message (FIG. 13I). The e-mail is addressed (FIG. 13J) and then sent to its intended recipient (FIG. 13K).

Returning briefly to FIG. 11, the Map Viewer Module 1005 links all other LBS modules (i.e. Locate Module 1009, Route module 1007) together for the purpose of displaying a map with points of interest to the user; labeling and highlighting the map data; supporting interactive map use (e.g. pan/zoom, search, etc.); supporting integration with LBS-enabled applications (Address Book 1111, Email 1015); and maintaining a persistent storage (cache) of previously viewed maps. Map data is stored into the local cache store prior to exiting the module. If a map of a location requested for a particular zoom level is not available in the local cache store but a map of the same or generally the same location is available at another, for example, coarser zoom level (i.e. the device may have previously cached map data at a different zoom level but the map data requested is for a zoom level that is not available in the cache), Map Viewer Module 1005, takes the best available map (e.g. coarser map for another zoom level, if available) and displays it to the user while querying the server 121 with a Maplet Index request and optionally an AOI request for the detailed map (background process). If there are no maps to display, Map Viewer Module 1005 depicts an hour glass with a modal message box (e.g. "Awaiting response from server..."). Map Viewer Module 1005 is also responsible for managing waypoints and querying the LBS server 121 for map data.

As discussed above in connection with FIG. 2, the following three query scenarios may be supported in this example, wherein Map Application 1000 running on mobile device 100 queries the LBS server 121 for map data: (1) Maplet Index request: Get Maplet Indexes within an indicated field of view or bounding box (2) DEntry or data request: Get DEntry data for these Maplet Indexes and (3) AOI data request: Get all map data at predetermined or selected layers within an area of interest or bounding box which is typically the current field of view for device 100 (independently of obtaining the Maplet Indexes).

Figure 11A:
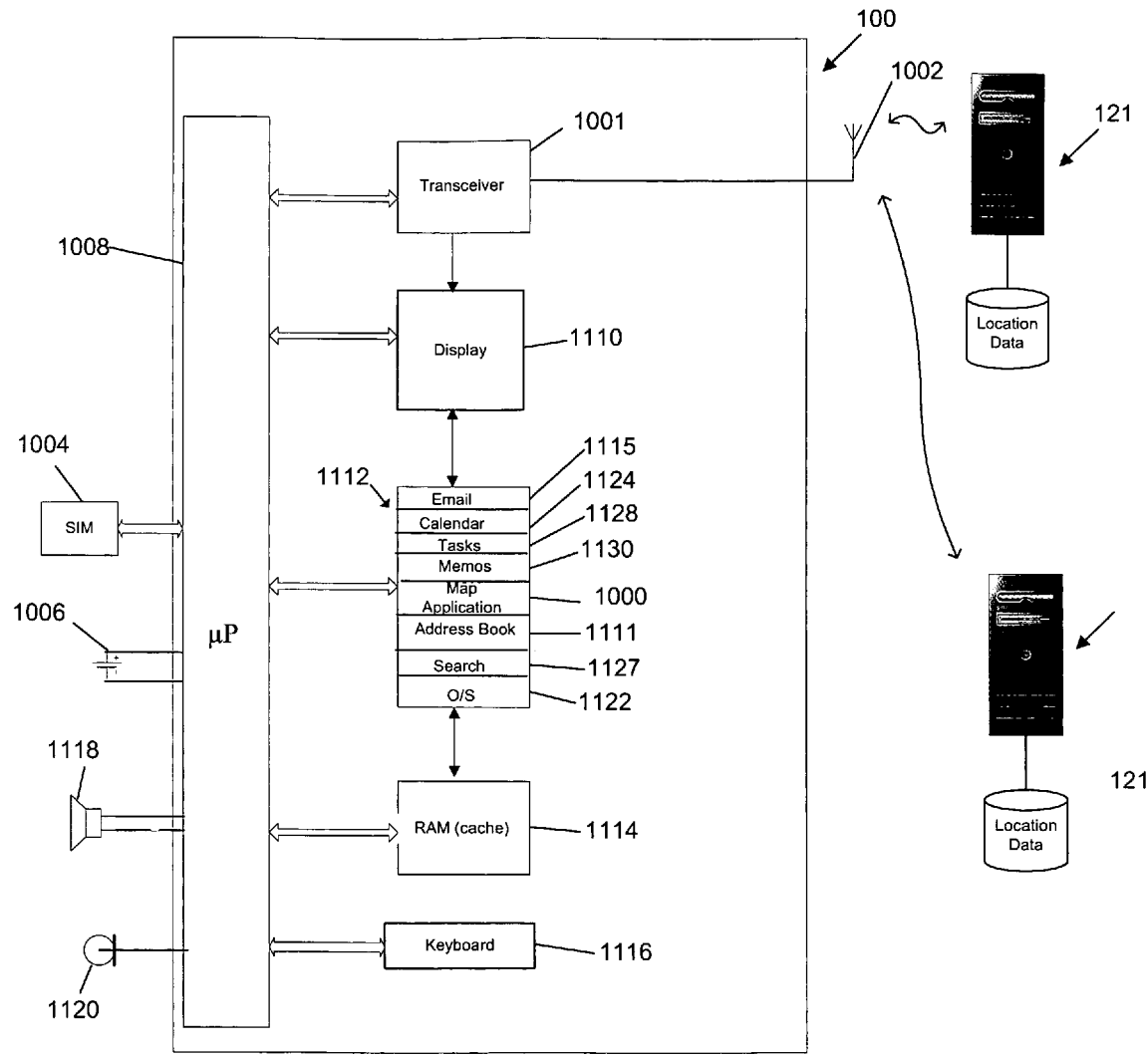
FIG. 11A is a simplified block diagram of an exemplary communication system for distribution of map content to a mobile communication device, including various hardware and software components that may reside on the mobile communication device, including an exemplary map application having multiple functional modules such shown in FIG. 11B.
Figure 11B:
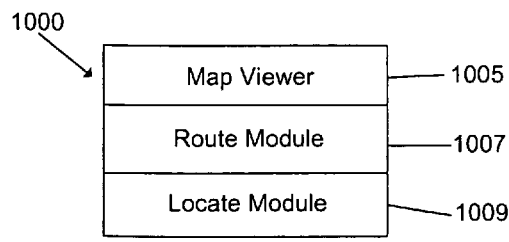
Figure 14:
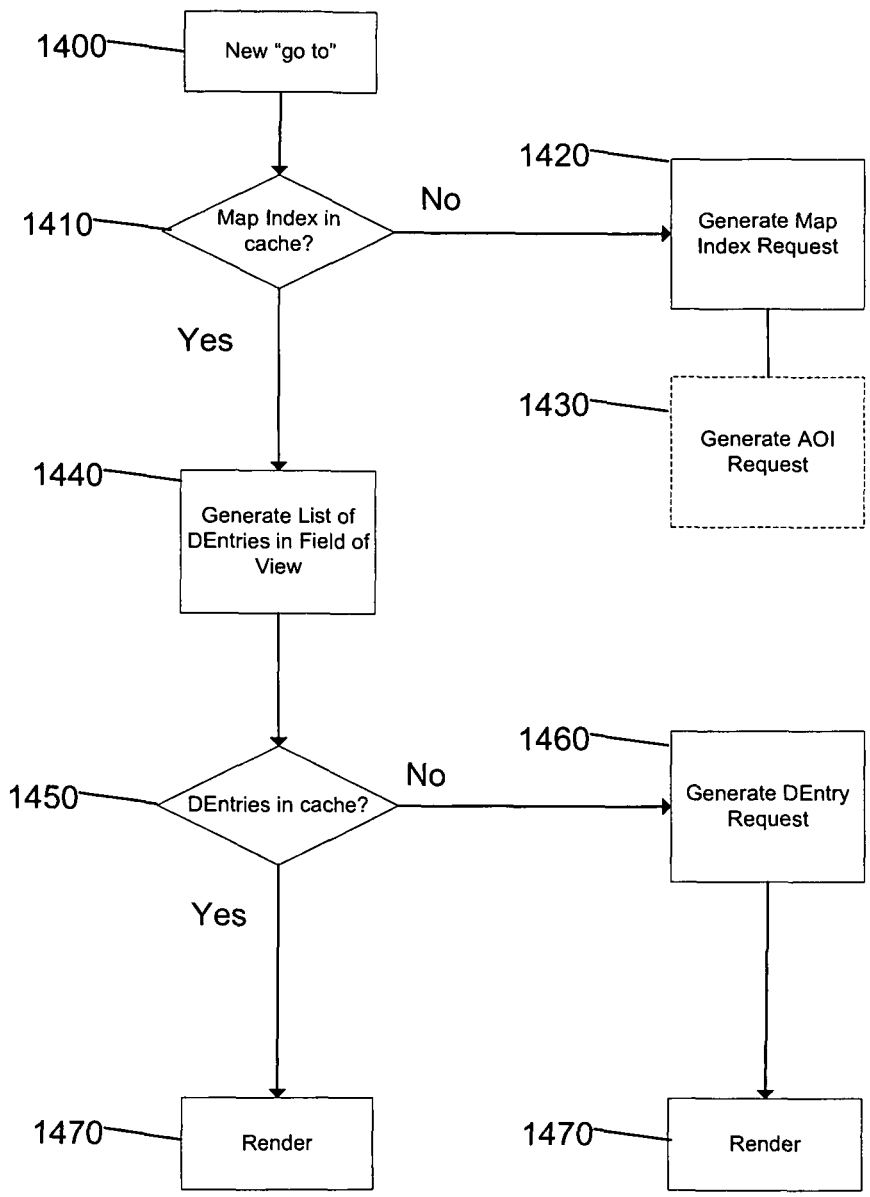
FIG. 14 illustrates an exemplary process for creating a request for map data within the mobile communication device and transmitting the map data from the map server to the communication device.
Figure 15:
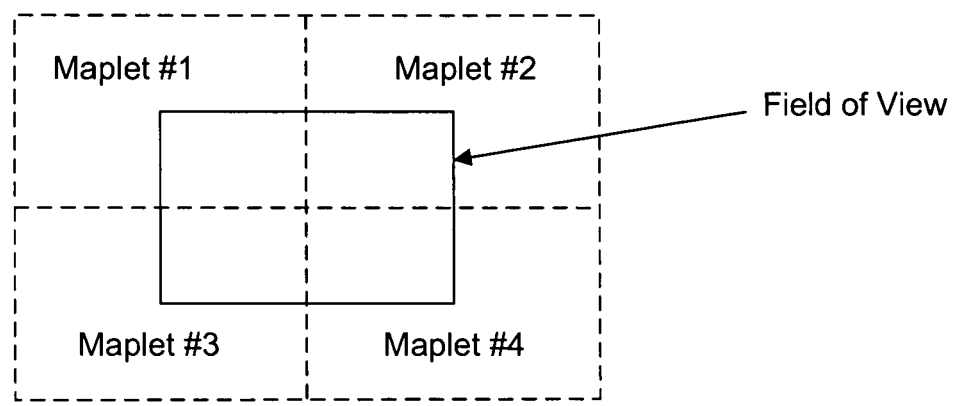
FIG. 15 shows an exemplary field of view intersecting multiple Maplets for illustrating the process of FIG. 14.

In operation, with reference to FIGS. 11A and 11B in conjunction with FIGS. 14 and 15, in response to a new "go to" request (step 1400), the Map Application 1000 checks its local store (i.e. cache 1114) to see if it already has the Maplet Index for a particular location (step 1410). The new "go to" request may be generated in response to the user of mobile communication device 100 moving into a new geographical area, selection of the "View Map" menu item in the Address Book 1111, or other action). Also, it will be understood that the map application 1000 may require Maplet Indexes for more than one Maplet. Thus, with reference to the exemplary scenario of FIG. 15 the user's field of view overlaps four Maplets such that Maplet Indexes are required from each of the four Maplets.

If the requested map data is not already stored in the local cache, the Map Application 1000 takes the best available map and displays it to the user and at the same time generates a Maplet Index request (step 1420). Optionally, the map application 1000 may also simultaneously generate an AOI request for DEntries for a specified set of Layers (if they exist) in a given area (bounding box) specified in the request from mobile communication device 100, which results in faster downloading and rendering of coarse-level map data. An advantage of generating the AOI request simultaneously with the Maplet Index request is that map server 121 is accessed only once.

The map server (or multiple servers) 121 retrieves the requested Maplet Indexes (and optionally the AOI data) for the four maplets from its associated location data repository, and collates the results to build the "Maplet Index (and optionally the AOI) Response Message" (FIG. 2). Finally, the server 121 returns the Maplet Index with/without the AOI Response Message to the device 100.

After rendering map data resulting from an AOI request, the downloaded Maplet Index data may be used to further refine the rendered map information through subsequent DEntry requests.

Specifically, upon receiving the Maplet Index Response Message, or in the event the cache 1114 already contains the Maplet Indexes, the Map Application 1000 determines what DEntries (map data) it needs (based, for example, on user context, preferences, etc., as discussed above), and then generates the list of the DEntries associated with the specified field of view (step 1440).

For each DEntry in the cache (step 1450) the Map Application 1000 assembles the data and displays the map of the selected location on the screen of device 100 (step 1470), as shown for example in FIGS. 12C, 12E, etc.

If the requested DEntries are not already stored in the local cache 1114, then the Map Application 1000 generates a DEntry request (step 1460) and, upon receipt of the requested DEntries then renders the map graphic (step 1470).

To summarize the operational steps set forth above, a Maplet Index request is first generated, followed by specific DEntry requests based on knowledge of the Maplets resulting from the contents of the downloaded Maplet Indexes. In some instances (such as when the mobile device 100 moves into a new geographical area), the Maplet Index request may be accompanied by an AOI request so that a coarse map graphic may be quickly rendered within the new field of view (e.g. for particular layers of the Maplet) followed by additional DEntry requests based on the downloaded Maplet Index, for further refining the rendered map graphic (e.g. to obtain data Points representing artifacts and labels from additional layers of the Maplet).

A person skilled in the art, having read this description may conceive of variations and alternative embodiments. For example, it is contemplated that Maplet Indexes may be preloaded onto mobile communication device 100 so as to be available at all times, rather than requiring downloading from the server 121.

All such variations and alternative embodiments are believed to be within the ambit of the claims appended hereto.

What is claimed is:

1. A method of rendering map data on a mobile communication device, comprising:
   transmitting from said mobile communication device to a server storing said map data including (i) a plurality of data entries arranged in a plurality of layers, each data entry containing data points defining an artifact or a label, and (ii) an index listing said data entries and excluding said data points:
   an index request for said index of said data entries relating to a specified area identified by coordinates; and an area of interest request for said data entries within a selected subset of said layers and relating to said specified area;

in response to said index request, receiving said index at said mobile communication device;

in response to said area of interest request, receiving said data entries within said selected subset of said layers;

automatically determining, at said mobile communication device, from said index which of the data entries are contextually relevant using context information;

in response to the determining, automatically transmitting a data entry request from said mobile communication device to said server for at least one of said data entries determined to be contextually relevant; and in response to the data entry request, receiving said at least one requested data entry, including said data points; and rendering said artifacts or labels defined by said data points of said data entries within said selected subset of said layers and said at least one requested data entry on a display of said mobile communication device.

2. The method of claim 1, wherein said index request and said data entry request each includes a zoom parameter.

3. The method of claim 1, wherein said map data includes a plurality of maplets each containing at least one of said data entries arranged in said layers, and wherein said area of interest request includes a layer mask for masking unwanted layers, and an additional mask for masking unwanted data entries.

4. The method of claim 1, wherein said context information relates to a context of use of said mobile communication device.

5. The method of claim 1, wherein said area of interest request includes a zoom parameter.

6. The method of claim 1, wherein said index request and said area of interest request are transmitted from said mobile communication device as a single message.

7. The method of claim 3, wherein said data entries include one of either public data or private data.

8. The method according to claim 4, wherein said context of use includes at least one of a speed at which the mobile communication device is traveling or an altitude of the mobile communication device.

9. A device for rendering map data, comprising:
a processor;
a display;
a transceiver connected to said processor, for communicating with a server storing said map data including (i) a plurality of data entries arranged in a plurality of layers, each data entry containing data points defining an artifact or a label, and (ii) an index listing said data entries and excluding said data points; and
a memory storing a map application executable by said processor for: transmitting to said server via said transceiver:
(i) an index request for said index of said data entries relating to a specified area identified by coordinates; and
(ii) an area of interest request for said data entries within a selected subset of said layers and relating to said specified area,
in response to said index request, receiving said index via said transceiver;
in response to said area of interest request, receiving said data entries within said selected subset of said layers via said transceiver;
automatically determining from said index which of the data entries are contextually relevant using context information;

in response to the determining, automatically transmitting a data entry request to said server via said transceiver for at least one of said data entries determined to be contextually relevant; and in response to the data entry request, receiving said at least one requested data entry, including said data points; and rendering said artifacts or labels defined by said data points of said data entries within said selected subset of said layers and said at least one requested data entry on said display.

10. The device of claim 9, wherein said map application further comprises at least one of a Map Viewer, a Route Module, and a Locate Module.

11. The device of claim 10, wherein said Map Viewer is adapted to receive Latitude and Longitude data as inputs and in response use the Latitude and Longitude data as arguments to render map graphics.

12. The device of claim 10, further comprising a local cache for storing said index and said data entries and being adapted in response to a "go to" request for a particular location, to check the local cache to determine whether the index for the location is already stored in the local cache, and display a best available map from said cache.

13. The device of claim 11, wherein said Locate Module is adapted to convert civic addresses to said Latitude and Longitude coordinates for use by said Map Viewer.

14. The device of claim 13, wherein said Route Module is adapted to generate a set of decision points to enable rendering by said Map Viewer of turn-by-turn indications.

15. A location data repository for storing map data for use by a computer, the location data repository comprising a data structure for map data covering a specified area identified by coordinates, said data structure including (i) a plurality of data entries arranged in a plurality of layers, each data entry containing data points defining an artifact or a label within said coordinates; and (ii) an index listing said data entries and excluding said data points, said index further comprising rendering attributes for each of said data entries, wherein the index is downloadable to a mobile device and the data entries are organized such that they can be selected for download to said mobile device.

16. The location data repository of claim 15, wherein said index includes a header for identifying said map data.

17. The location data repository of claim 15, wherein said set of data points are separated into different parts representing various portions of the artifact.

18. The location data repository of claim 15, wherein said layers enable map data from different sources to be meshed for rendering.

19. The location data repository of claim 15, wherein said rendering attributes include at least one of a zoom index, a shape type, a line type and a color field.

20. A server for distributing map content, comprising:
a location data repository as claimed in claim 15; and
application means for receiving a request for said map data and in response transmitting at least one of said index and selected ones of said data entries containing at least one of geographical data points and labels within a specific bounding area, thereby enabling rendering of said geographical data points and labels for display.

21. The server of claim 20, wherein said application means is adapted to perform context filtering for selective transmitting of said data entries.

22. The server of claim 20, wherein said in layers enable map data from different sources to be meshed for rendering.

23. The server of claim 22, wherein said application means is adapted to mask unwanted layers and unwanted data entries prior to transmitting.

24. The server of claim 20, wherein said application means is adapted to transmit said index and selected ones of said data entries as a single message.

25. The server of claim 20, wherein said data entries include one of either public data or private data.

26. A method of distributing map content, comprising:
- storing map data in a location data repository as claimed in claim 15;
- receiving an index request for said index from a mobile communication device;
- receiving an area of interest request for said data entries within a selected subset of said layers and relating to said specified area from said mobile communication device;
- In response to said index request, transmitting said index to said mobile communication device;
- in response to said area of interest request, transmitting said data entries within said selected subset of said layers to said mobile communication device;
- receiving a data entry request from said mobile communication device for at least one requested data entry determined by said mobile communication device to be contextually relevant; and
- in response to data entry request, transmitting said at least one requested data entry to said mobile communication device, thereby enabling rendering of said artifacts or labels defined by said data points of said at least one requested data entry for display at said mobile communication device.

27. The method of claim 26, further comprising context filtering for selective transmitting of said data entries.

28. The method of claim 26, wherein said layers enable map data from different sources to be meshed for rendering.

29. The method of claim 28, further comprising masking unwanted layers and unwanted data entries prior to transmitting said at least one requested data entry.

30. The method of claim 26, wherein said index and said data entries within said selected subset of said layers are transmitted as a single message.

31. The method of claim 26, wherein said data entries include one of either public data or private data.

32. The method of claim 3, wherein said index request and said data entry request includes a zoom parameter.

33. The method of claim 3, wherein said area of interest request includes a zoom parameter.

34. A persistent store embodying program code executable by a processor of a computing device or system for implementing the method of claim 1.

35. The method of claim 1, wherein said context information includes a user occupation.

* * * * *